US012567281B2

(12) United States Patent
Hung et al.

(10) Patent No.: US 12,567,281 B2
(45) Date of Patent: Mar. 3, 2026

(54) PROCESSING METHOD AND ELECTRONIC DEVICE FOR SELECTING MULTIMEDIA IMAGE BASED ON RANKING, TERMINAL DEVICE COMMUNICATIVELY CONNECTED THERETO, AND NON-TRANSITORY COMPUTER-READABLE RECORDING MEDIUM

(71) Applicant: COMPAL ELECTRONICS, INC., Taipei (TW)

(72) Inventors: Hui-Mei Hung, Taipei (TW); Yu-Ning Chang, Taipei (TW); Yueh-Hua Lee, Taipei (TW); Pin-Yu Chou, Taipei (TW); Ming-Hsien Wu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 288 days.

(21) Appl. No.: 18/396,730

(22) Filed: Dec. 27, 2023

(65) Prior Publication Data

US 2024/0221421 A1     Jul. 4, 2024

Related U.S. Application Data

(60) Provisional application No. 63/435,815, filed on Dec. 29, 2022.

(51) Int. Cl.
*G06V 40/16* (2022.01)
*G06T 7/62* (2017.01)

(52) U.S. Cl.
CPC .............. G06V 40/172 (2022.01); G06T 7/62 (2017.01); G06V 40/161 (2022.01); G06V 40/168 (2022.01); *G06T 2207/30201* (2013.01); *G06V 2201/07* (2022.01)

(58) Field of Classification Search
CPC ........... G06T 2207/30201; G06T 7/62; G06V 2201/07; G06V 40/161; G06V 40/168; G06V 40/172
See application file for complete search history.

(56) References Cited

U.S. PATENT DOCUMENTS

| | | | | |
|---|---|---|---|---|
| 7,711,145 | B2 * | 5/2010 | Gallagher | G06F 18/29 |
| | | | | 348/169 |
| 10,489,445 | B1 * | 11/2019 | Carter | G06V 20/30 |
| 11,036,990 | B2 * | 6/2021 | Lian | G06V 10/82 |

(Continued)

*Primary Examiner* — Tsung Yin Tsai

(57) ABSTRACT

A processing method for selecting a multimedia image based on a ranking performed by an electronic device includes reading an executable code, identifying multiple multimedia images by using artificial intelligence, and performing rating and sorting processing on the multiple multimedia images. The method includes the steps of target detection, interaction analysis, position assessment, facial confirmation, and ranking. The method obtains a total grading score for each multimedia image by summing according to a target confirmation grading score, an interaction grading score, a position grading score, and a facial confirmation grading score, and selects a user-desired multimedia image according to a ranking of the total grading score. An electronic device for selecting a multimedia image based on a ranking and a terminal device communicatively connected thereto, and a non-transitory computer-readable recording medium are also provided.

17 Claims, 24 Drawing Sheets

(56)         References Cited

U.S. PATENT DOCUMENTS

| 2007/0177805 A1* | 8/2007 | Gallagher | G06V 10/84 |
| | | | 707/E17.026 |
| 2010/0278420 A1* | 11/2010 | Shet | G06F 18/24765 |
| | | | 382/156 |
| 2014/0006042 A1* | 1/2014 | Keefe | G16H 10/20 |
| | | | 705/2 |
| 2015/0324636 A1* | 11/2015 | Bentley | A63F 13/212 |
| | | | 386/227 |
| 2020/0218897 A1* | 7/2020 | Lian | H04N 23/611 |
| 2021/0294423 A1* | 9/2021 | Zhou | G06F 3/017 |
| 2021/0294427 A1* | 9/2021 | Zhou | G06F 3/017 |
| 2023/0045237 A1* | 2/2023 | Wexler | G06V 40/20 |
| 2023/0396869 A1* | 12/2023 | Chou | G06T 7/20 |

* cited by examiner

PROCESSING METHOD AND ELECTRONIC DEVICE FOR SELECTING MULTIMEDIA IMAGE BASED ON RANKING, TERMINAL DEVICE COMMUNICATIVELY CONNECTED THERETO, AND NON-TRANSITORY COMPUTER-READABLE RECORDING MEDIUM

CROSS-REFERENCE TO RELATED APPLICATION

This non-provisional application claims priority under 35 U.S.C. § 119(e) on US provisional Patent Application No. 63/435,815 filed on Dec. 29, 2022, the entire contents of which are hereby incorporated by reference.

BACKGROUND OF THE INVENTION

1. Field of the Invention

The present disclosure relates to an image processing technique, and in particular to a processing method and an electronic device for selecting a multimedia image based on a ranking, a terminal device communicatively connected thereto, and a non-transitory computer-readable recording medium.

2. Description of the Related Art

In a conventional infant monitoring system, each of the multimedia images is captured by a camera device of the system, image analysis and computing can be performed on each of the multimedia images (such as photos) by using an artificial intelligence (AI) recommendation system, a score can be given for each of the multimedia images, and selection can then be performed automatically according to this score.

However, when the multimedia images are selected by the AI recommendation system, selection conditions set are not assigned with different weightings, for example, determining a score based on conditions such as whether a face in a multimedia image has clear facial features or facial expressions, whether a proportion of a human body is too small or positioned too close to a corner in the multimedia image, and whether characters in a multimedia image interact with one another. Thus, a multimedia image selected by a conventional AI recommendation system inevitably encounters an issue of falling short of user expectations.

BRIEF SUMMARY OF THE INVENTION

The present disclosure provides a processing method and an electronic device for selecting a multimedia image based on a ranking, a terminal device communicatively connected thereto, and a non-transitory computer-readable recording medium, which are capable of rating multiple selection conditions according to weightings so that a selected multimedia image can meet user expectations.

To achieve the objective above, the present disclosure provides a processing method for selecting a multimedia image based on a ranking. The method is performed by an electronic device using reading an executable code, identifying a plurality of multimedia images by using artificial intelligence, and performing rating and sorting processing on the multiple multimedia images. The method includes the steps of target detection, interaction analysis, position assessment, facial confirmation, and ranking. The step of target detection includes identifying by using artificial intelligence whether any of the multimedia images contains a target object, determining whether the target object in the multimedia image satisfies a confidence threshold indicating that a body and a face are clear, and assigning a target confirmation grading score. The step of interaction analysis includes, when two or more of the target objects are identified in any of the multimedia images by using artificial intelligence, detecting a body frame and a facial frame of each of the target objects, determining whether the body frame of each of the target objects has an intersection, and assigning an interaction grading score. The step of position assessment includes, for any of the multimedia images, determining a level of centering of a position relative to a center of the multimedia image according to the body frame of one of the target objects or according to a body set frame defined by two or more of the target objects to cover a plurality of the body frames, and assigning a position grading score. The step of facial confirmation includes identifying, by artificial intelligence, whether the face of the target object of any of the multimedia images contains an infant, and assigning a facial confirmation grading score. The step of ranking includes obtaining a total grading score for each of the multimedia images by summing according to the target confirmation grading score, the interaction grading score, the position grading score, and the facial confirmation grading score obtained in the steps above, and selecting at least one of the multimedia images that are top-ranked according to the ranking of the total grading score.

In an embodiment, the processing method further includes a step of facial rating, including identifying, by artificial intelligence, multiple multimedia images in which the target object is the infant, assigning a facial rating grading score from high to low in decremental order according to the facial frame of the target object which is the infant, wherein the total grading score is obtained from a sum including the facial rating grading score.

In an embodiment, before the step of facial rating, for the multiple target objects which are the infants in any of the multimedia images, face areas are compared and the facial rating is performed on the largest facial frame as a representative.

In an embodiment, in the step of interaction analysis, for the multimedia image where two or more target objects are located and where it is detected that each of the body frames has an intersection, the interaction grading score is assigned from high to low according to order that each of, only a part of or none of the body frames has a face.

In an embodiment, in the step of interaction analysis, whether each of the body frames has an intersection is determined by using an original size of the body frame, or is determined after the original size of the body frame is scaled up by a one-fold increase, wherein the interaction grading score for no intersection is zero.

In an embodiment, in the step of target detection and/or facial confirmation, if two or more target objects are identified in any of the multimedia images by using artificial intelligence and one of the target objects is the infant, a facial set frame is defined to cover the plurality of facial frames, and it is determined whether the body frame of the infant and the facial set frame have an intersection.

In an embodiment, in the step of position assessment, the multimedia images where the body frame and the body set frame are located are all rectangles, and a border of the multimedia image where the body frame or the body set frame is located includes an upper distance, a lower distance, a left distance, and a right distance. A first ratio is obtained by regarding the longer between the upper distance and the lower distance as a denominator and the shorter as a numerator. A second ratio is obtained by regarding the longer between the left distance and the right distance as a denominator and the shorter as a numerator. Each of the first ratio and the second ratio is compared with a position threshold to assign the position grading score. A position grading score with both the first ratio and the second ratio being greater than the position threshold is greater than a position grading score with only one of the first ratio and the second ratio being greater than the position threshold.

In an embodiment, in the step of position assessment, a predetermined region within the multimedia image where the body frame or the body set frame is located is set. If at least one side of the body frame or the body set frame exceeds the predetermined region, the position grading score is a negative value. Moreover, a negative value of the position grading score for the body frame or the body set frame that exceeds both of two adjacent sides of at least one right angle of the predetermined region is higher than a negative value of the position grading score for the body frame or the body set frame that exceeds one side or two opposite sides of the predetermined region.

In an embodiment, in the step of position assessment, the predetermined region is in a size proportionally downscaled from the original size of the multimedia image.

In an embodiment, the processing method further includes a step of an artificial intelligence recommendation, including performing body and face recognition on the plurality of multimedia images by the artificial intelligence to obtain a recommendation grading score, wherein the total grading score is obtained from a sum including the recommendation grading score.

The present disclosure further provides a non-transitory computer-readable recording medium for the method above.

The present disclosure further provides an electronic device for selecting a multimedia image based on a ranking, and the electronic device provided is communicatively connected to a database. The electronic device receives a plurality of multimedia images to perform rating and sorting processing on the plurality of multimedia images by using artificial intelligence. The electronic device includes a camera unit and a processing unit electrically connected to the camera unit. The processing unit includes a target detection module, an interaction analysis module, a position assessment module, a facial confirmation module, and a ranking module. The camera unit is for capturing the plurality of multimedia images. The target detection module is adapted to identify, by using artificial intelligence, whether any of the multimedia images contains a target object, determine whether the target object in the multimedia image satisfies a confidence threshold indicating that a body and a face are clear, and assign a target confirmation grading score. The interaction analysis module is adapted to, when two or more of the target objects are identified in any of the multimedia images by using artificial intelligence, detect a body frame and a facial frame of each of the target objects, determine whether the body frame of each of the target objects has an intersection, and assign an interaction grading score. The position assessment module is adapted to, for any of the multimedia images, determine a level of coverage of a predetermined region in the multimedia image according to the body frame of one of the target objects or according to a body set frame defined by two or more of the target objects to cover a plurality of the body frames, and assign a position grading score. The facial confirmation module is adapted to, when the face of the target object in any one of the multimedia images is identified as an infant by using artificial intelligence, assign a facial confirmation grading score. The ranking module is electrically connected to the target detection module, the interaction analysis module, the position assessment module, and the facial confirmation module, and is adapted to, obtain a total grading score for each of the multimedia images by summing according to the target confirmation grading score, the interaction grading score, the position grading score, and the facial confirmation grading score obtained by the modules above, and select at least one of the multimedia images that are top-ranked according to the ranking of the total grading score.

In an embodiment, the electronic device is a physical host and/or a cloud host.

In an embodiment, the target object includes an infant, and the database further includes a facial feature identification sub-database for identifying whether the infant has clear facial features to determine whether the face of the target object is clear.

In an embodiment, the electronic device further includes a facial rating module adapted to identify, by artificial intelligence, multiple multimedia images in which the target object is an infant, and assign a facial rating grading score from high to low in decremental order according to the facial frame of the target object which is the infant, wherein the total grading score is obtained from a sum including the facial rating grading score.

In an embodiment, the electronic device further includes an artificial intelligence recommendation module adapted to perform body and facial recognition on the plurality of multimedia images by artificial intelligence to obtain a recommendation grading score, wherein the total grading score is obtained from a sum including the recommendation grading score. In an embodiment, the electronic device further includes an artificial intelligence recommendation module adapted to perform body and facial recognition on the plurality of multimedia images by the artificial intelligence to obtain a recommendation grading score, wherein the total grading score is obtained from a sum including the recommendation grading score.

The present disclosure further provides a terminal device communicatively connectable to the electronic device. The terminal device is loaded with an application and executes the application to play at least one of the multimedia images that are top-ranked and selected by the step of ranking.

Thus, with the processing method and electronic device for selecting a multimedia image based on a ranking of the present disclosure, summing is performed according to the assigned target confirmation grading score, interaction grading score, position grading score, and facial confirmation grading score after the method is performed, and multimedia images are sorted based on the total grading score obtained, so that the selected multimedia image satisfies conditions of having a target object, having an infant in a target object, containing more interactive image contents, and a character in the image being more centered, thereby meeting user expectations.

Moreover, the total grading score can be further added with a facial rating grading score, which is assigned from high to low in decremental order according to the facial frame of the target object which is an infant, so that the face of the infant in the target object is bigger and more apparent and the selected multimedia image better meets user expectations.

In addition, in the processing method and electronic device for selecting a multimedia image based on a ranking of the present disclosure, body and face recognition are first performed by using artificial intelligence to obtain a recommendation grading score which is summed into the total grading score, and to integrate applications of AI recommendation systems selecting multimedia images, so that the selected multimedia image further meets user expectations.

6

Figure 10A:
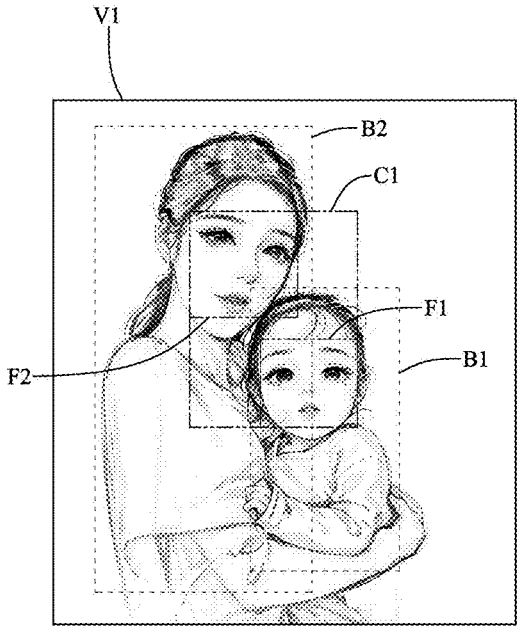
FIG. 10A is a schematic diagram of a multimedia image of process D of an embodiment of the present disclosure.
Figure 10B:
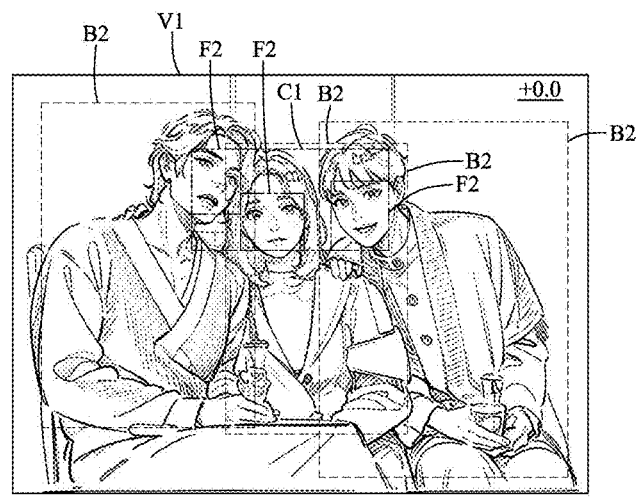
FIG. 10B is a schematic diagram of a multimedia image of process D of an embodiment of the present disclosure.
Figure 10C:
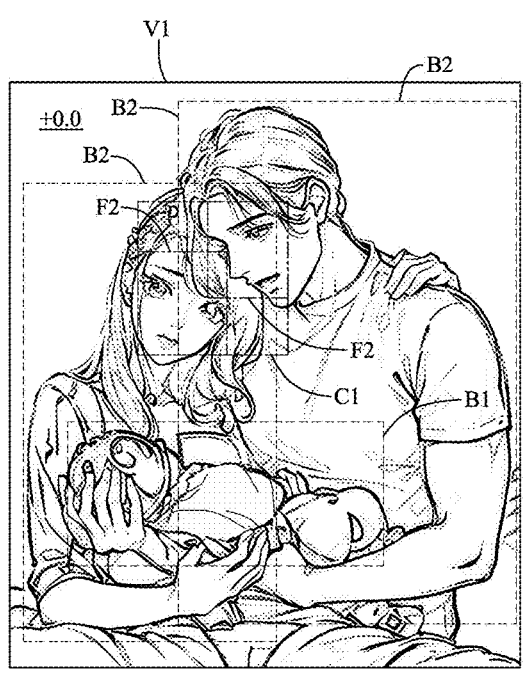

FIG. 10C is a schematic diagram of a multimedia image of process D of an embodiment of the present disclosure.

Figure 11:
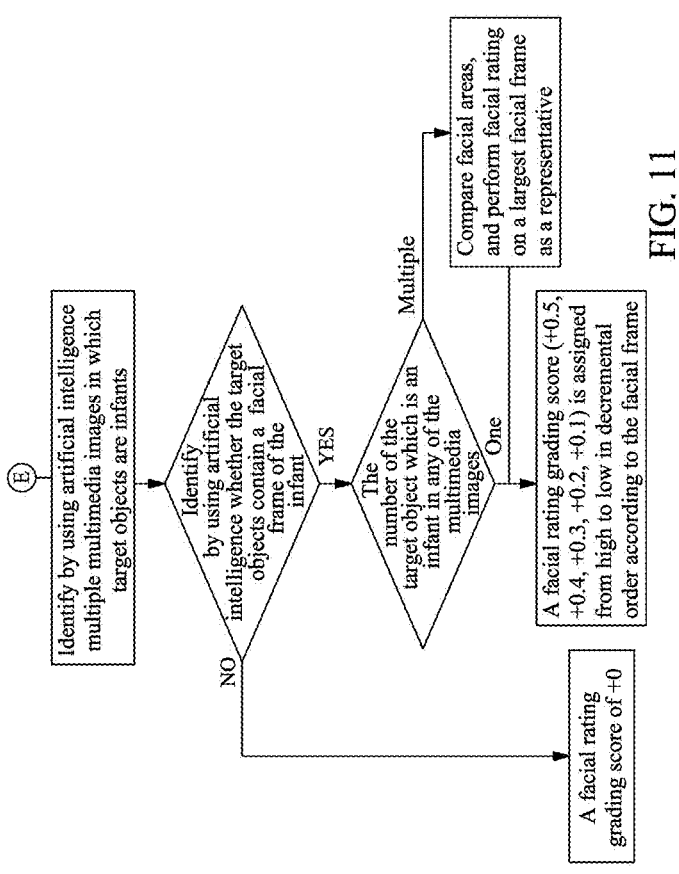

FIG. 11 is a flowchart illustrating process E according to an embodiment of the present disclosure.

Figures 12A, 12B, 12C, 12D, 12E, 12F:
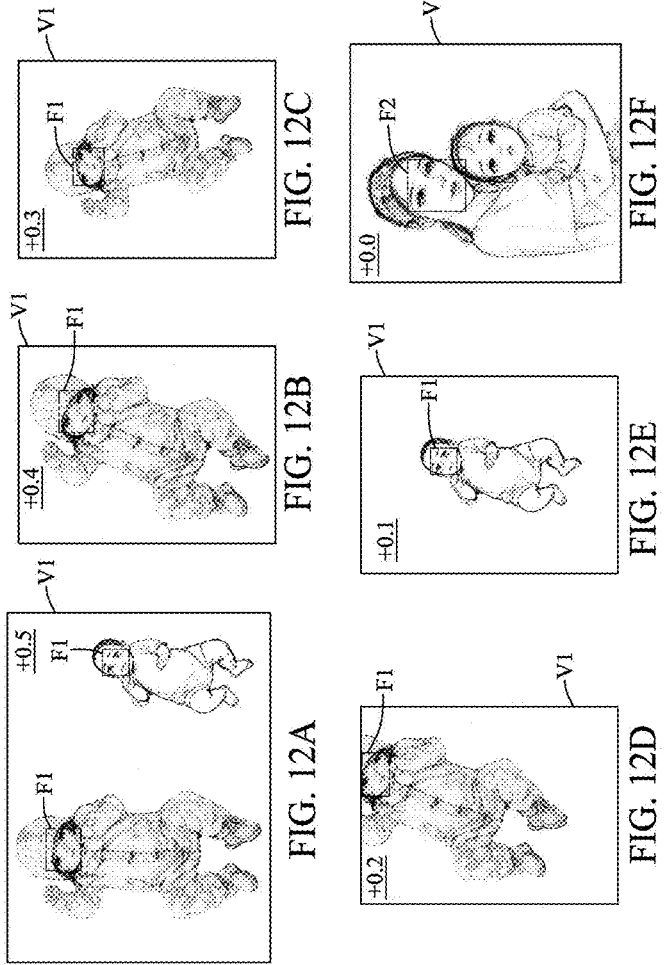

FIG. 12A is a schematic diagram of a multimedia image of process E of an embodiment of the present disclosure.

FIG. 12B is a schematic diagram of a multimedia image of process E of an embodiment of the present disclosure.

FIG. 12C is a schematic diagram of a multimedia image of process E of an embodiment of the present disclosure.

FIG. 12D is a schematic diagram of a multimedia image of process E of an embodiment of the present disclosure.

FIG. 12E is a schematic diagram of a multimedia image of process E of an embodiment of the present disclosure.

FIG. 12F is a schematic diagram of a multimedia image of process E of an embodiment of the present disclosure.

Figure 13:
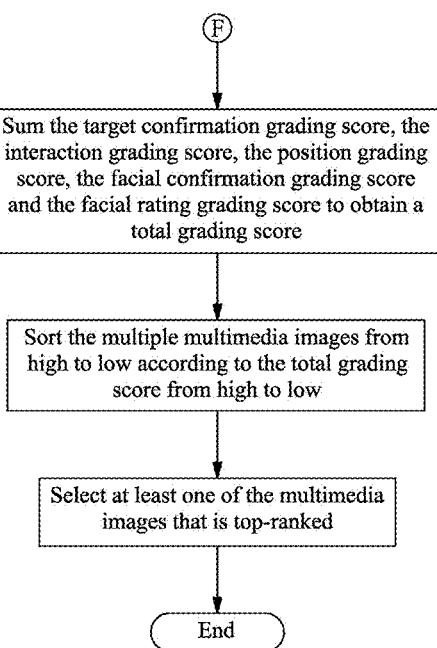

FIG. 13 is a flowchart illustrating process F according to an embodiment of the present disclosure.

Figure 14:
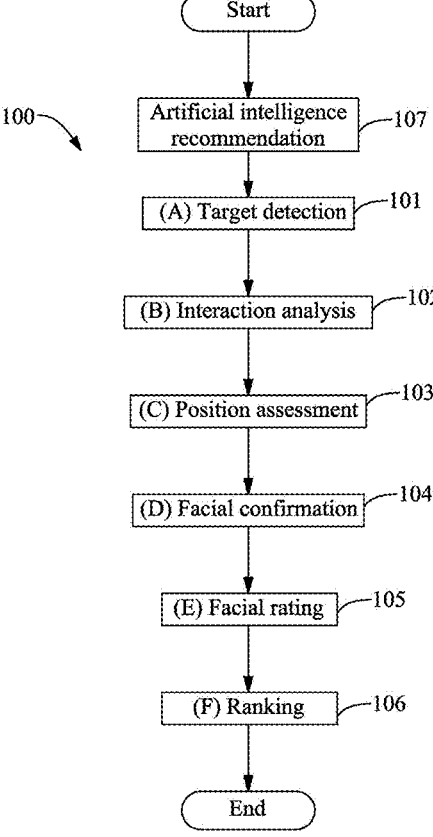

FIG. 14 is a flowchart of the main steps of a method according to an embodiment of the present disclosure.

Figure 15:
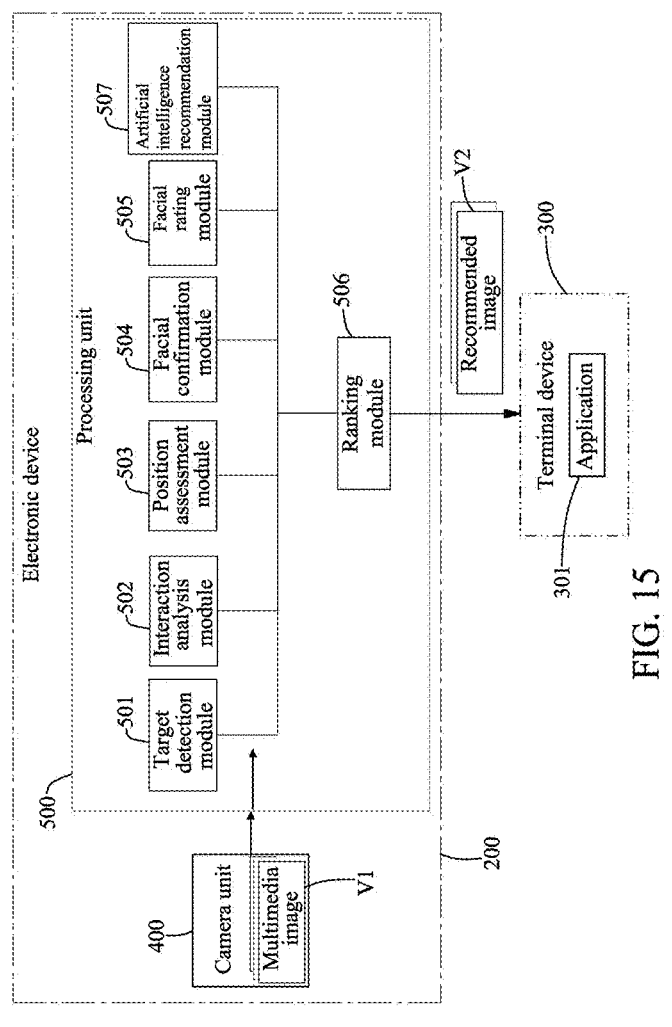

FIG. 15 is a block diagram of an electronic device performing the method of FIG. 14.

Figure 16:
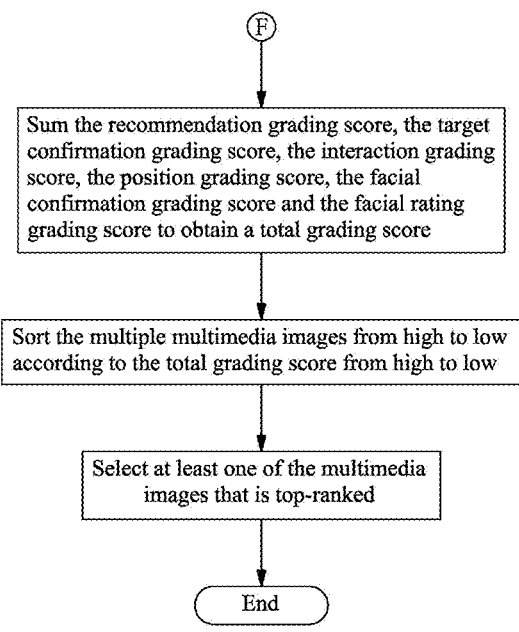

FIG. 16 is a flowchart illustrating process F according to an embodiment of the present disclosure.

DETAILED DESCRIPTION OF THE INVENTION

To facilitate understanding of the objective, characteristics, and effects of the present disclosure, embodiments together with the attached drawings for the detailed description of the present disclosure are provided.

Referring to FIG. 1 to FIG. 16, the present disclosure provides a processing method 100 and an electronic device 200 for selecting a multimedia image based on a ranking, a terminal device 300 communicatively connected to the electronic device 200, and a non-transitory computer-readable recording medium.

Figure 1:
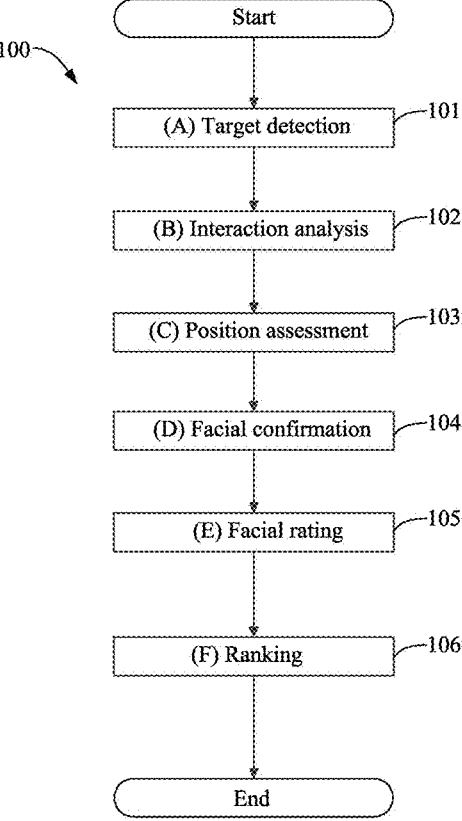
FIG. 1 is a flowchart of the main steps of a method according to an embodiment of the present disclosure.

The processing method 100 is performed by the electronic device 200 using reading an executable code, identifying a plurality of multimedia images by using artificial intelligence, and performing steps of target detection 101 (represented as process A in FIG. 1 to correspond to FIG. 3), interaction analysis 102 (represented as process B in FIG. 1 to correspond to FIG. 5), position assessment 103 (represented as process C in FIG. 1 to correspond to FIG. 7), facial confirmation 104 (represented as process D in FIG. 1 to correspond to FIG. 9), facial rating 105 (represented as process E in FIG. 1 to correspond to FIG. 11) and ranking 106 (represented as process F in FIG. 1 to correspond to FIG. 13) shown in the embodiment in FIG. 1, to perform rating and sorting processing on the multimedia images. The order for performing the steps of the target detection 101 to the facial rating 105 is merely used to describe an embodiment of the present disclosure, and the present disclosure is not limited to the order recited in embodiments.

A plurality of executable codes executed by the processing method 100 can be stored in the non-transitory computer-readable recording medium so that the electronic device 200 can read from the non-transitory computer-readable recording medium and then execute these executable codes.

Figure 2:
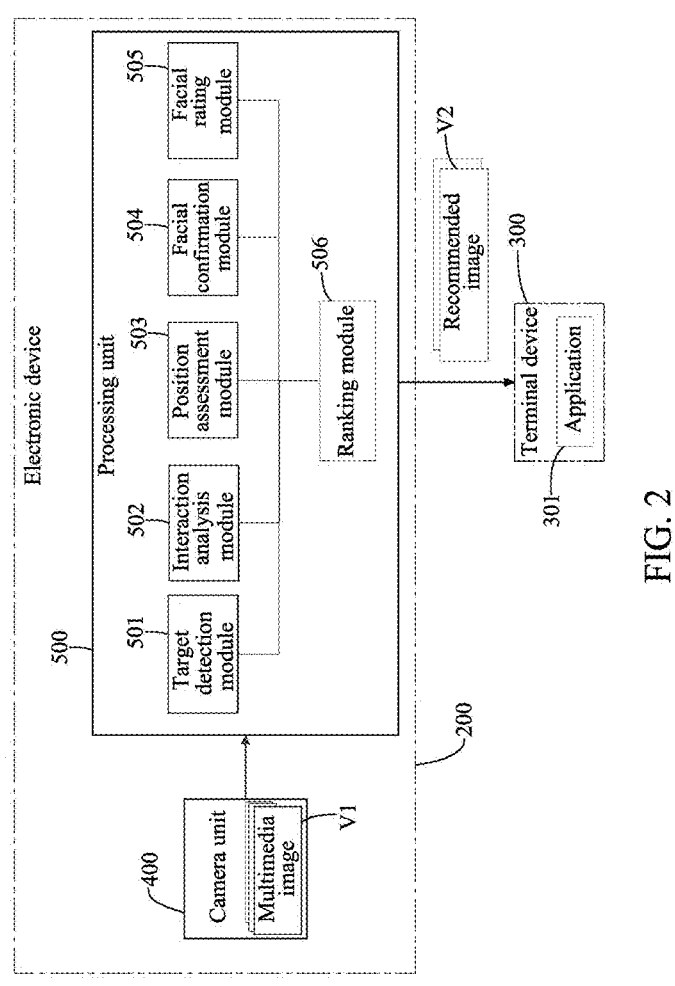
FIG. 2 is a block diagram of an electronic device performing the method of FIG. 1.

The electronic device 200 that performs the processing method 100 is first described. In an embodiment, as shown in FIG. 2, the electronic device 200 includes a camera unit 400 and a processing unit 500. The camera unit 400 is electrically connected to the processing unit 500. The processing unit 500 includes a target detection module 501, an interaction analysis module 502, a position assessment module 503, a facial confirmation module 504, a facial rating module 505, and a ranking module 506. The target detection module 501 is for performing the step of target detection 101, the interaction analysis module 502 is for performing the step of interaction analysis 102, the position assessment module 503 is for performing the step of position assessment 103, the facial confirmation module 504 is for performing the step of facial confirmation 104, the facial rating module 505 is for performing the step of facial rating 105, and the ranking module 506 is for performing the step of ranking 106, to rate and sort a multimedia image V1 to select a recommended image V2, wherein the recommended image V2 can be pushed to the terminal device 300.

In continuation of the above, the electronic device 200 is a physical host and is disposed at the same machine as the camera device 400 electrically connected thereto. However, the present disclosure is not limited to the examples above, and the electronic device 200 can also be a cloud host. The multimedia image V1 can be stored in a database (not shown), which can be a cloud server or a local server. The electronic device 200 is communicatively connected to the database, and the recommended image V2 generated after the electronic device 200 performs the processing method 100 is transmitted to, received by, and stored in the database.

Figure 3:
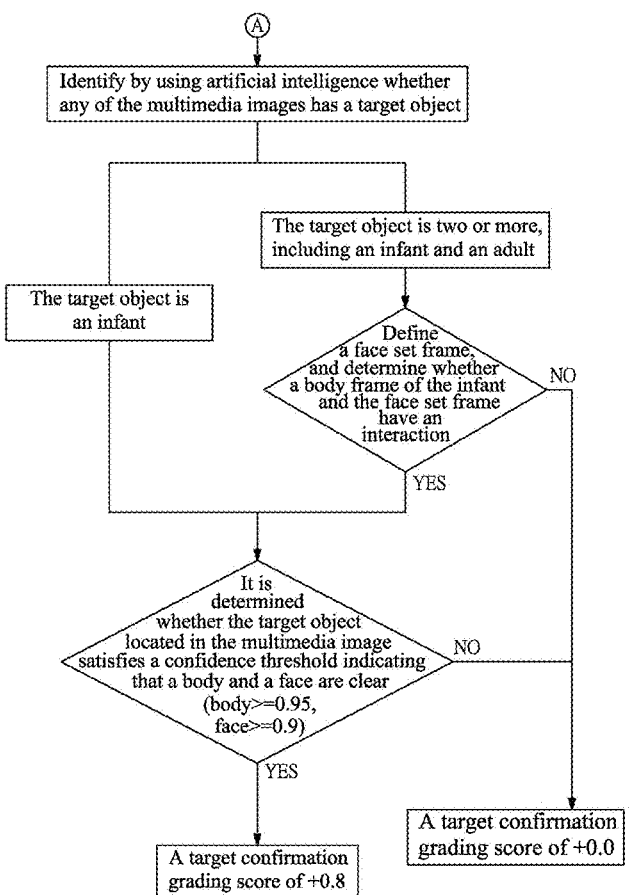
FIG. 3 is a block diagram illustrating process A according to an embodiment of the present disclosure.

When the step of target detection 101 is performed, referring to process A shown in FIG. 3, it is identified by using artificial intelligence whether any of the multimedia images contains a target object, it is determined whether the target object located in the multimedia image satisfies a confidence threshold indicating that a body and a face are clear, and a target confirmation grading score is assigned.

Figures 4A, 4B, 4C, 4D:
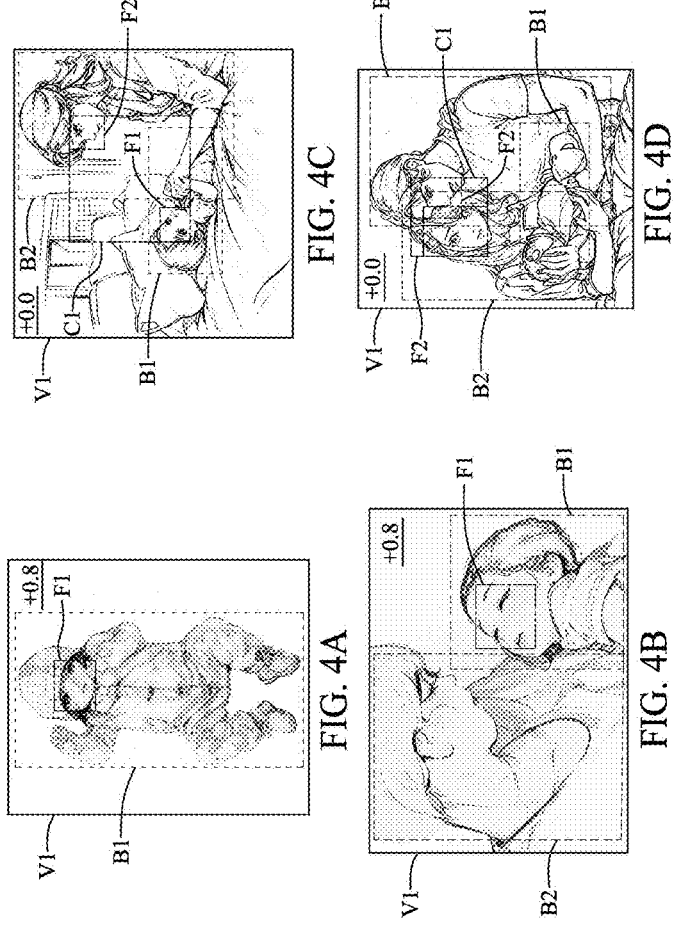
FIG. 4A is a schematic diagram of a multimedia image of process A of an embodiment of the present disclosure.
FIG. 4B is a schematic diagram of a multimedia image of process A of an embodiment of the present disclosure.
FIG. 4C is a schematic diagram of a multimedia image of process A of an embodiment of the present disclosure.
FIG. 4D is a schematic diagram of a multimedia image of process A of an embodiment of the present disclosure.
Figure 5:
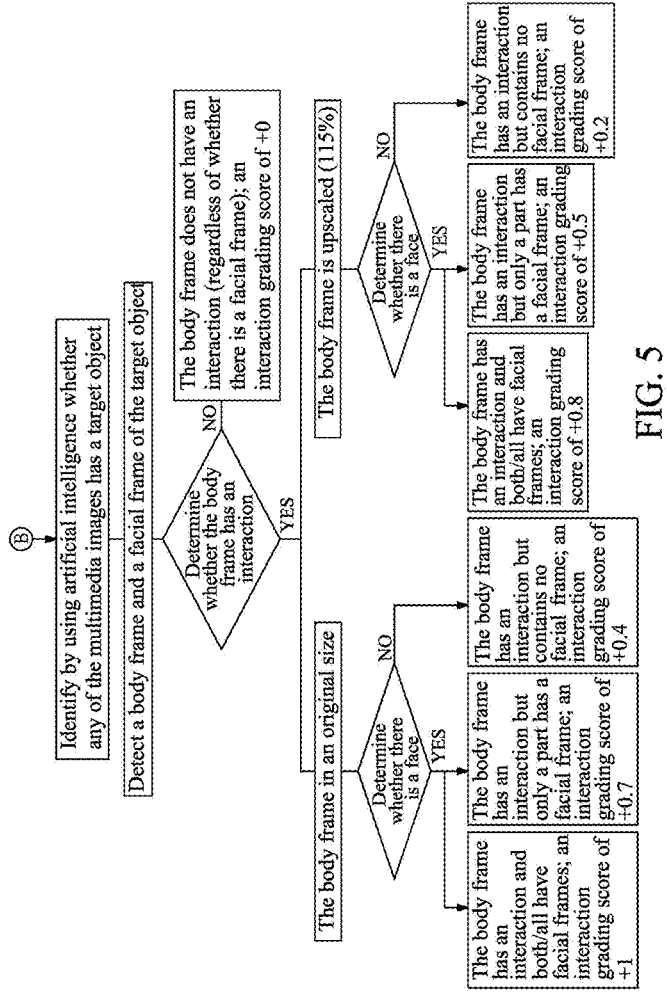
FIG. 5 is a flowchart illustrating process B according to an embodiment of the present disclosure.

In continuation of the above, for example, as shown in FIG. 4A, for a target object which is an infant in the multimedia image V1, a body frame B1 and a facial frame F1 are identified by using artificial intelligence. Assume that it is confirmed that the confidence threshold of a body is 0.95 and the confidence threshold of a face is 0.9. When it is detected that the confidence score of the body of the target object is 0.98 as shown in FIG. 4A and is greater than the confidence threshold of the body of 0.95, and it is detected that the confidence score of the face of the target object is 0.92 as shown in FIG. 4A and is greater than the confidence threshold of the face of 0.9, a target confirmation grading score of +0.8 is assigned to indicate that the target object in the multimedia image V1 is clear. If it is detected that the confidence score of the body of the target object is lower than the confidence threshold of the body, and/or the confidence score of the face of the target object is lower than the confidence threshold of the face, a target confirmation grading score of +0 is assigned to indicate that the target object in the multimedia image V1 is not clear.

As shown in FIG. 4B, for target objects which are an infant and an adult in the multimedia image V1, a body frame B1 and a facial frame F1 of the infant as well as a body frame B2 and a facial frame F2 of the adult are identified by using artificial intelligence. Moreover, it is also identified that the facial frame F1 is within the body frame B1 of the infant in the multimedia image V1, and it is further determined that the body frame B1 of the infant and the facial frame F1 have an intersection. When it is detected that a confidence score of the body of the target object is 0.96 as shown in FIG. 4B and is greater than the confidence threshold of the body of 0.95, and it is detected that a confidence score of the face of the target object is 0.99 as shown in FIG. 4B and is greater than the confidence threshold of the face of 0.9, a target confirmation grading score of +0.8 is assigned to indicate that the target object in the multimedia image V1 is clear. If it is detected that the confidence score of the body of the target object is lower than the confidence threshold of the body, and/or the confidence score of the face of the target object is lower than the confidence threshold of the face, a target confirmation grading score of +0 is assigned to indicate that the target object in the multimedia image V1 is not clear.

In an embodiment, in the step of target detection 101, referring to process A shown in FIG. 3, if two or more target objects are identified in any of the multimedia images V1 by using artificial intelligence and one of the target objects is an infant, a facial set frame C1 is defined to cover the multiple facial frames F1 and F2, and it is determined whether the body frame B1 of the infant and the facial set frame C1 have an intersection.

In continuation of the above, as shown in FIG. 4C, for target objects which are an infant and an adult in the multimedia image V1, the body frame B1 of the infant and the body frame B2 of the adult are identified by using artificial intelligence, and it is identified that the facial frame F1 is within the body frame B1 of the infant in the multimedia image V1 and the facial frame F2 is within the body frame B2 of the adult. At this point, the facial set frame C1 is defined to cover all of the faces, and it is determined whether the body frame B1 of the infant and the facial set frame C1 have an intersection. If not, the target confirmation grading score is +0; if so, as shown in FIG. 4C, since it is detected that the confidence score of the body of the infant is 0.85 which is less than the confidence threshold of the body of 0.95 and it is detected that a confidence score of the face of the infant is 0.97 which is less than the confidence threshold of the face of 0.9, that is, the confidence scores of both the body and the face of the infant are less than the respective confidence thresholds, a target confirmation grading score of +0 is assigned to indicate that the target objects in the multimedia image V1 are not clear.

As shown in FIG. 4D, for target objects which are an infant and two adults in the multimedia image V1, body frame B1 of the infant and body frames B2 of the adults are identified by using artificial intelligence, and it is further identified that each of the body frames B2 of the adults contains a facial frame F2 within but the body frame B1 of the infant does not contain any face in the multimedia image V1. At this point, a facial set frame C1 is defined to cover both of the facial frames. It is further determined whether the body frame B1 of the infant and the facial set frame C1 have an intersection. If not, as shown in FIG. 4D, that is, no face is detected within the body frame B1 of the infant, a target confirmation grading score of +0 is directly assigned to indicate that the target objects in the multimedia image V1 are not clear.

The step of interaction analysis 102 is performed after the step of target confirmation 101. When the step of interaction analysis 102 is performed, referring to process B shown in FIG. 5, when two or more target objects are identified in any of the multimedia images by using artificial intelligence, a body frame and a facial frame of each of the target objects are detected, and it is determined whether the body frame of each of the target objects has an intersection, and an interaction grading score is assigned. In an embodiment, in the step of interaction analysis 102, for a multimedia image where two or more target objects are located and where it is detected that each of the body frames has an intersection, the interaction grading score is assigned from high to low according to the order that each of, only a part of and none of the body frames has a face.

Figures 6A, 6B, 6C:
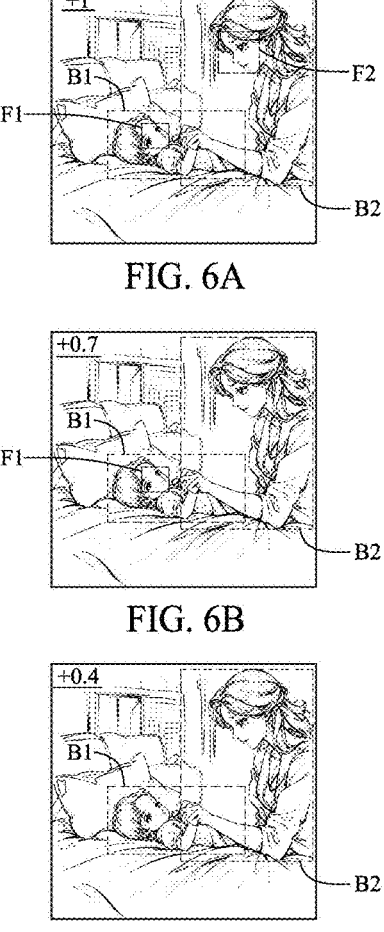
FIG. 6A is a schematic diagram of a multimedia image of process B of an embodiment of the present disclosure.
FIG. 6B is a schematic diagram of a multimedia image of process B of an embodiment of the present disclosure.
FIG. 6C is a schematic diagram of a multimedia image of process B of an embodiment of the present disclosure.

As shown in FIG. 6A, for target objects which are an infant and an adult in the multimedia image V1, a body frame B1 of the infant and a body frame B2 of the adult are identified by using artificial intelligence, and it is identified that a facial frame F1 is within the body frame B1 of the infant in the multimedia image V1 and that a facial frame F2 is within the body frame B2 of the adult. At this point, it is determined whether the body frame B1 of the infant and the body frame B2 of the adult have an intersection. If the body frame B1 of the infant and the body frame B2 of the adult have an intersection, and the body frame B1 contains the facial frame F1 and the body frame B2 also contains the facial frame F2, an interaction grading score of +1 is assigned. As shown in FIG. 6B, if the body frame B1 of the infant and the body frame B2 of the adult have an intersection, but only the body frame B1 of the infant contains the facial frame F1, an interaction grading score of +0.7 is assigned. Further, as shown in FIG. 6C, if the body frame B1 of the infant and the body frame B2 of the adult have an intersection, but neither of the body frame B1 of the infant and the body frame B2 of the adult contains a face and does not have a facial frame, an intersection grading score of +0.4 is assigned.

In an embodiment, in the step of interaction analysis 102, whether each of the body frames has an intersection is determined by using an original size of the body frame, or is determined after the original size of the body frame is scaled up by a one-fold increase, wherein the interaction grading score for no intersection is zero.

Figures 6D, 6E, 6F:
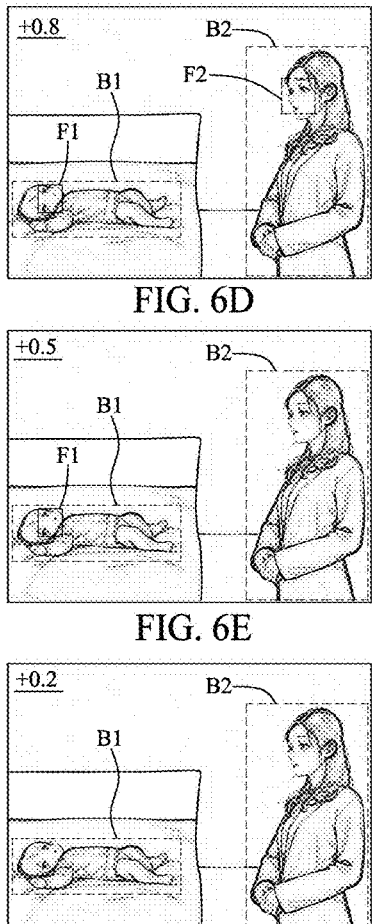
FIG. 6D is a schematic diagram of a multimedia image of process B of an embodiment of the present disclosure.
FIG. 6E is a schematic diagram of a multimedia image of process B of an embodiment of the present disclosure.
FIG. 6F is a schematic diagram of a multimedia image of process B of an embodiment of the present disclosure.
Figure 6G:
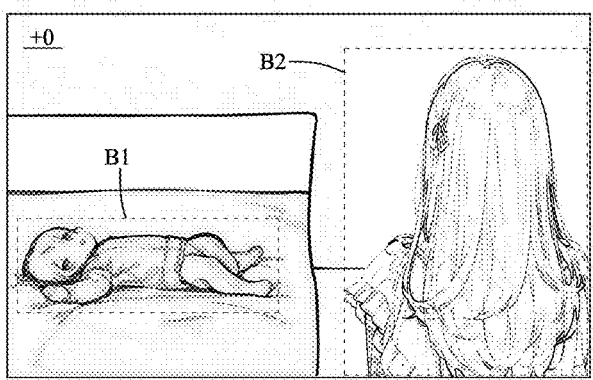
FIG. 6G is a schematic diagram of a multimedia image of process B of an embodiment of the present disclosure.
Figure 7:
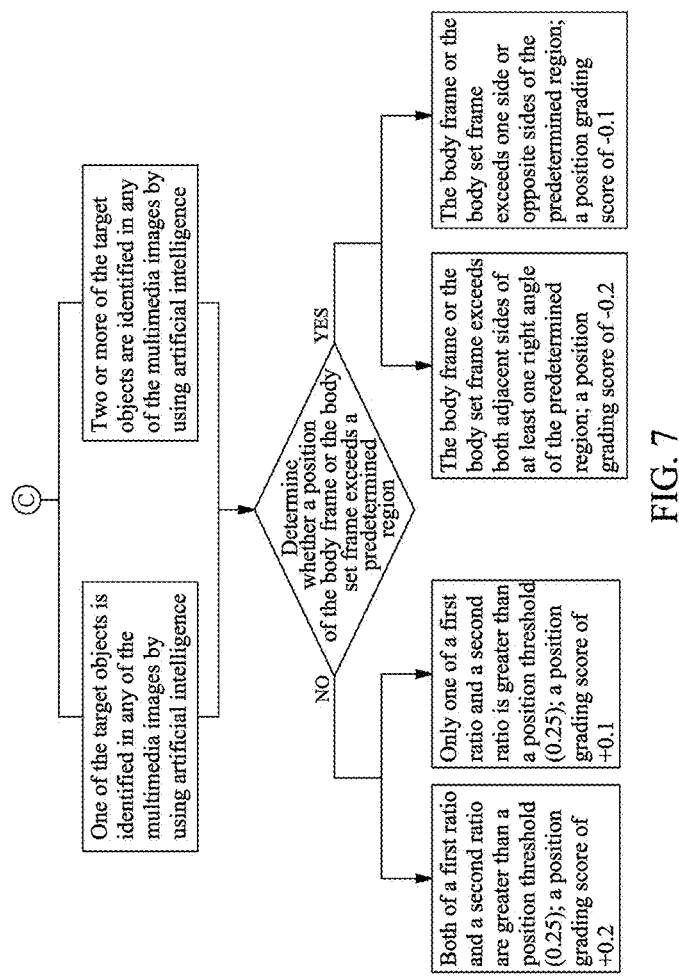
FIG. 7 is a flowchart illustrating process C according to an embodiment of the present disclosure.

As shown in FIG. 6D, for target objects which are an infant and an adult in the multimedia image V1, a body frame B1 of the infant and a body frame B2 of the adult are identified by using artificial intelligence, and it is identified that a facial frame F1 is within the body frame B1 of the infant in the multimedia image V1 and that a facial frame F2 is within the body frame B2 of the adult. If it is preliminarily determined that the body frame B1 of the infant and the body frame B2 of the adult do not have an intersection, the body frame B1 of the infant and the body frame B2 of the adult are upscaled to 115% of the original sizes. At this point, if the body frame B1 of the infant and the body frame B2 of the adult have an intersection, the body frame B1 contains the facial frame F1 and the body frame B2 also contains the facial frame F2, an interaction grading score of +0.8 is assigned. As shown in FIG. 6E, the body frame B1 of the infant and the body frame B2 of the adult are upscaled to 115% of the original sizes, and at this point, if the body frame B1 of the infant and the body frame B2 of the adult have an intersection, but only the body frame B1 of the infant contains the facial frame F1, an interaction grading score of +0.5 is assigned. Further, as shown in FIG. 6F, if the body frame B1 of the infant and the body frame B2 of the adult are upscaled to 115% of the original sizes, and at this point, the body frame B1 of the infant and the body frame B2 of the adult have an intersection, but neither of the body frame B1 of the infant and the body frame B2 of the adult contains a face and does not have a facial frame, an intersection grading score of +0.2 is assigned. However, as shown in FIG. 6G, if the body frame B1 of the infant and the body frame B2 of the adult are upscaled to 115% of the original sizes, and at this point, the body frame B1 of the infant and the body frame B2 of the adult do not have an intersection, regardless of whether the body frames of the infant and the adult contain a facial frame, an intersection grading score of +0 is assigned.

The step of position assessment 103 is performed after the step of interaction analysis 102. When the step of position assessment 103 is performed, referring to process C shown in FIG. 7, for any of the multimedia images, a level of centering of a position relative to the center of the multimedia image is determined according to the body frame of one of the target objects or according to a body set frame defined by two or more of the target objects to cover a plurality of the body frames, and a position grading score is assigned. In an embodiment, in the step of position assessment 103, the multimedia images where the body frame and the body set frame are located are all rectangles, and a border of the multimedia image where the body frame or the body set frame is located includes an upper distance m, a lower distance n, a left distance a and a right distance b. A first ratio is obtained by regarding the longer between the upper distance m and the lower distance n as a denominator and the shorter as a numerator. A second ratio is obtained by regarding the longer between the left distance a and the right distance b as a denominator and the shorter as a numerator. Each of the first ratio and the second ratio is compared with a position threshold to assign the position grading score. A position grading score with both the first ratio and the second ratio being greater than the position threshold is greater than a position grading score with only one of the first ratio and the second ratio being greater than the position threshold.

Moreover, in the step of position assessment 103, a predetermined region Z within the multimedia image V1 where the body frame or the body set frame is located is set. The predetermined region Z is in a size proportionally downscaled from the original size of the multimedia image V1 in this embodiment. If at least one side of the body frame or the body set frame exceeds the predetermined region Z, the position grading score is a negative value. Moreover, a negative value of the position grading score for the body frame or the body set frame that exceeds both of two adjacent sides of at least one right angle of the predetermined region Z is higher than a negative value of the position grading score for the body frame or the body set frame that exceeds one side or two opposite sides of the predetermined region Z.

Figure 8A:
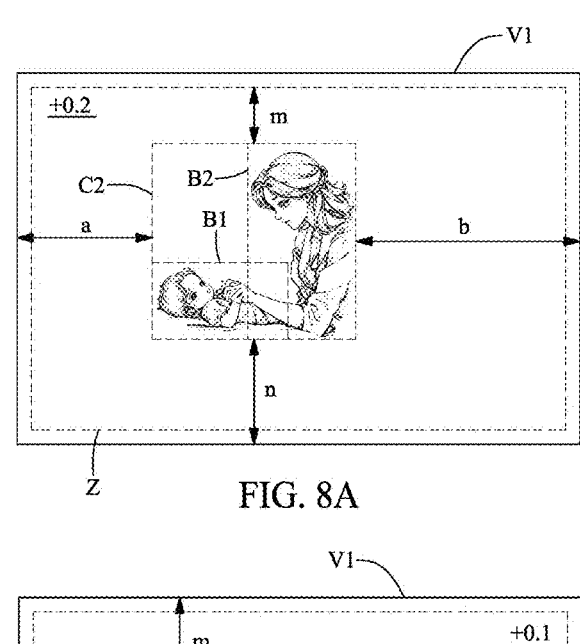
FIG. 8A is a schematic diagram of a multimedia image of process C of an embodiment of the present disclosure.
Figure 8B:
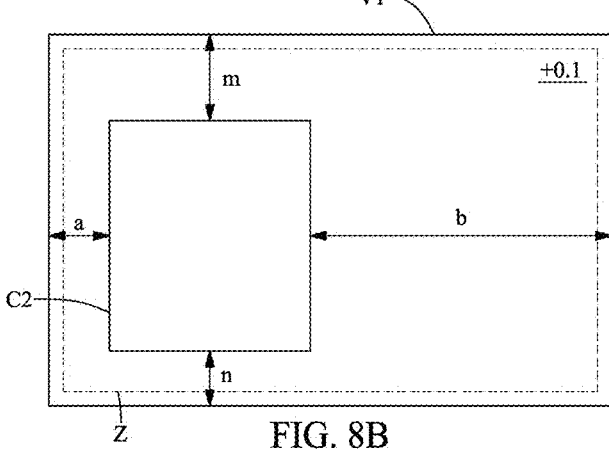
FIG. 8B is a schematic diagram of a multimedia image of process C of an embodiment of the present disclosure.
Figure 8C:
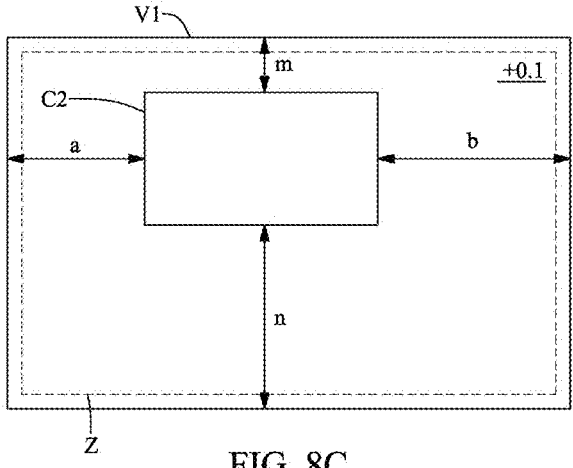
FIG. 8C is a schematic diagram of a multimedia image of process C of an embodiment of the present disclosure.
Figure 8D:
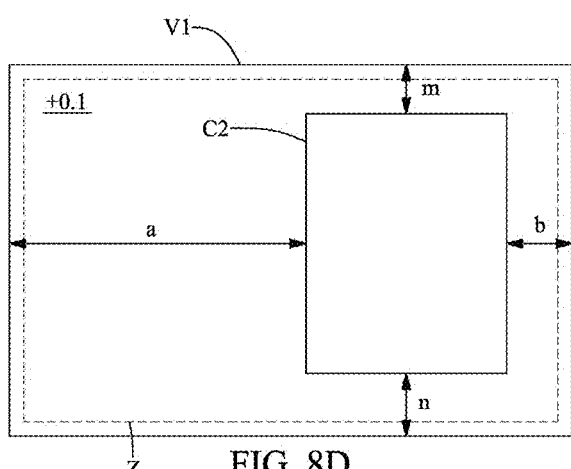
FIG. 8D is a schematic diagram of a multimedia image of process C of an embodiment of the present disclosure.

As shown in FIG. 8A to 8J, for target objects which are an infant and an adult in the multimedia image V1, a body frame B1 of the infant and a body frame B2 of the adult are identified by using artificial intelligence. According to a body set frame C2 defined to cover the body frame B1 of the infant and the body frame B2 of the adult, the body set frames C2 shown in FIG. 8A to FIG. 8D are all within the predetermined region Z, and so position grading scores thereof are positive values. As shown in FIG. 8A, a first ratio of 0.79 (m/n) is obtained since the lower distance n is longer than the upper distance m, and a second ratio of 0.89 (b/a) is obtained since the left distance a is longer than the right distance b. Assuming that a position threshold is predetermined as 0.25 (the same hereinafter), it is apparent that both the first ratio and the second ratio are greater than the position threshold, and so the position grading score of +0.2 is assigned. As shown in FIG. 8B, a first ratio of 0.65 (n/m) is obtained since the upper distance m is longer than the lower distance n, and a second ratio of 0.11 (a/b) is obtained since the right distance b is longer than the left distance a. At this point, only the first ratio is greater than the position threshold, and so the position grading score of +0.1 is assigned. As shown in FIG. 8C, a first ratio of 0.19 (m/n) is obtained since the lower distance n is longer than the upper distance m, and a second ratio of 0.54 (a/b) is obtained since the right distance b is longer than the left distance a. At this point, only the second ratio is greater than the position threshold, and so the position grading score of +0.1 is assigned. As shown in FIG. 8D, a first ratio of 0.58 (m/n) is obtained since the lower distance n is longer than the upper distance m, and a second ratio of 0.17 (b/a) is obtained since the right distance b is longer than the left distance a. At this point, only the first ratio is greater than the position threshold, and so the position grading score of +0.1 is assigned.

Figures 8E, 8F:
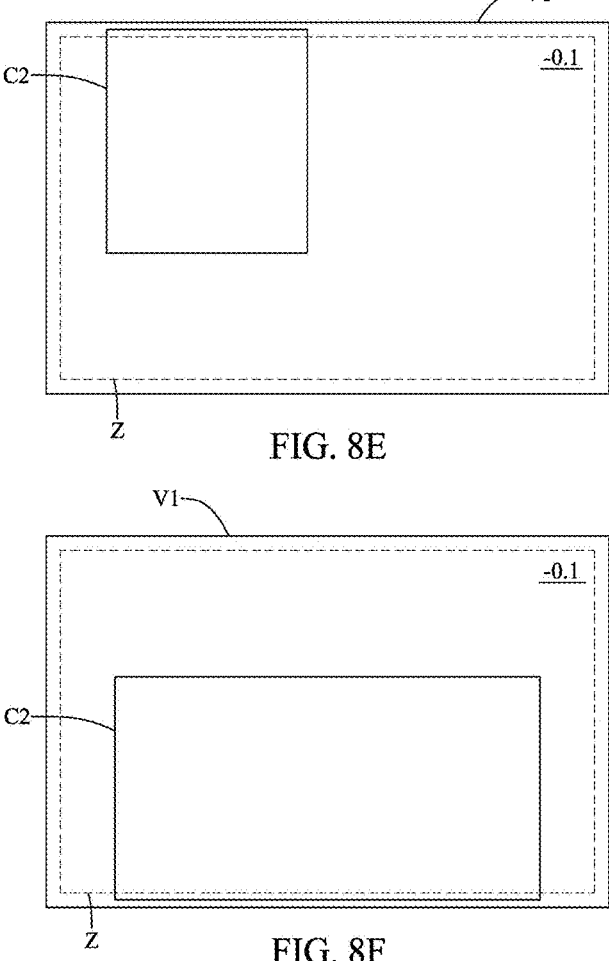
FIG. 8E is a schematic diagram of a multimedia image of process C of an embodiment of the present disclosure.
FIG. 8F is a schematic diagram of a multimedia image of process C of an embodiment of the present disclosure.
Figures 8G, 8H:
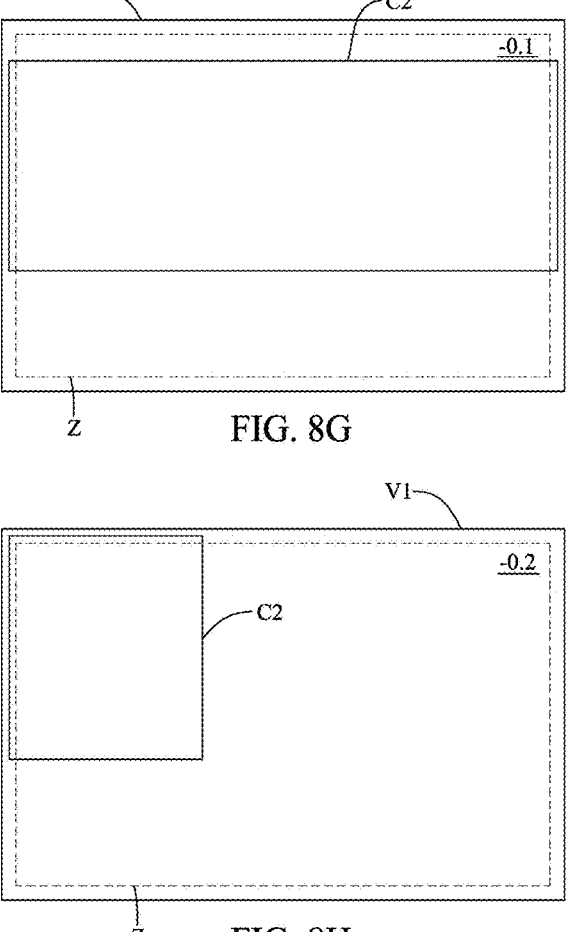
FIG. 8G is a schematic diagram of a multimedia image of process C of an embodiment of the present disclosure.
FIG. 8H is a schematic diagram of a multimedia image of process C of an embodiment of the present disclosure.
Figures 8I, 8J:
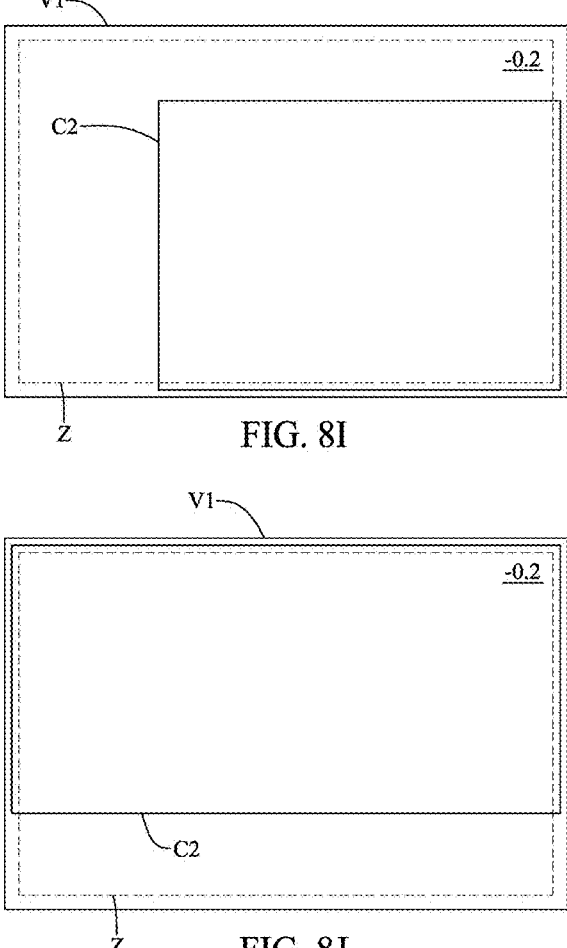
FIG. 8I is a schematic diagram of a multimedia image of process C of an embodiment of the present disclosure.
FIG. 8J is a schematic diagram of a multimedia image of process C of an embodiment of the present disclosure.
Figure 9:
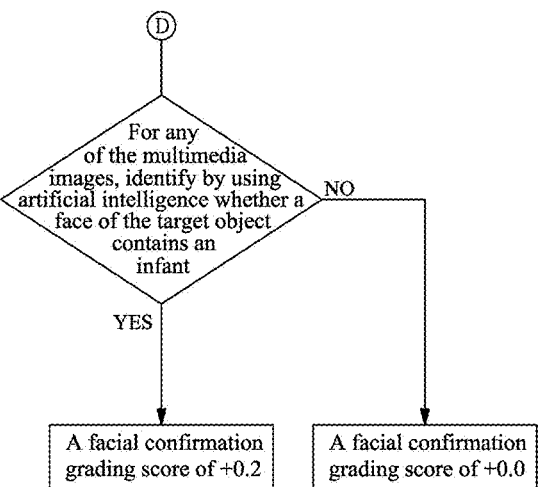
FIG. 9 is a flowchart illustrating process D according to an embodiment of the present disclosure.

In continuation of the above, the body set frames C2 shown in FIG. 8E to 8J are all outside the predetermined region Z, and so position grading scores thereof are negative values. As shown in FIG. 8E, a top side of the body set frame C2 completely exceeds the predetermined region Z. Or as shown in FIG. 8F, a bottom side of the body set frame C2 completely exceeds the predetermined region Z. Or as shown in FIG. 8G, a left side and a right side of the body set frame C2 completely exceed the predetermined region Z. At this point, according to the conditions in FIG. 8E to 8G, the position grading score of −0.1 is assigned to each of the above. As shown in FIG. 8H, a left side and a top side of the body set frame C2 exceed two adjacent sides of an upper-left right angle of the predetermined region Z. Or as shown in FIG. 8I, a right side and a bottom side of the body set frame C2 exceed two adjacent sides of a lower-right right angle of the predetermined region Z. Or as shown in FIG. 8J, a left side and a top side of the body set frame C2 exceed two adjacent sides of an upper-left right angle of the predetermined region Z, and a right side and a top side of the body set frame C2 exceed two adjacent sides of an upper-right right angle of the predetermined region Z. At this point, according to the conditions in FIG. 8H to 8J, the position grading score of −0.2 is assigned to each of the above.

The step of facial confirmation 104 is performed after the step of position assessment 103. When the step of facial confirmation 104 is performed, referring to process D shown in FIG. 9, it is identified by using artificial intelligence whether a face of the target object in any of the multimedia images contains an infant, and a facial confirmation grading score is assigned. In an embodiment, in the step of facial confirmation 104, if two or more target objects are identified in any of the multimedia images by using artificial intelligence and one of the target objects is the infant, a facial set frame is defined to cover the plurality of facial frames, and it is determined whether a body frame of the infant and the facial set frame have an intersection.

As shown in FIG. 10A, the multimedia image V1 contains an infant and an adult and it is identified that a facial frame F1 is within a body frame B1 of the infant in the multimedia image V1, and a facial confirmation grading score of +0.2 is assigned. As shown in FIG. 10B, if it is detected by using artificial intelligence that the multimedia image V1 contains body frames B2 and facial frames F2 of three adults and no infant is identified in the multimedia image V1, a facial confirmation grading score of +0 is assigned. As shown in FIG. 10C, if it is detected by using artificial intelligence that the multimedia image V1 contains body frames B2 of two adults and a body frame B1 of an infant, a facial set frame C1 is defined to cover multiple facial frames F2 according to the faces detected in the multimedia image V1, it is determined that the body frame B1 of the infant and the facial set frame C1 do not have an intersection and a facial confirmation grading score of +0 is assigned.

The step of facial rating 105 is performed after the step of facial confirmation 104. When the step of facial rating 105 is performed, refer to process E shown in FIG. 11, multiple multimedia images in which target objects are infants are identified, and a facial rating grading score is assigned from high to low in decremental order according to facial frames F1 of the target objects which are the infants.

In six multimedia images, V1 shown in FIG. 12A to FIG. 12F, for the multimedia image V1 shown in FIG. 12A, two infants are detected, and a facial frame F1 of each of the infants is detected. For the multimedia images, V1 shown in FIG. 12B to FIG. 12E, one infant is detected, and a facial frame F1 of the infant is individually detected. For the multimedia image V1 shown in FIG. 12F, one infant and one adult are detected, and a facial frame F2 is detected but no facial frame of the infant is detected.

In continuation of the above, in the multimedia images, V1 in FIG. 12A to FIG. 12E, the facial frame F1 of each infant in FIG. 12A to FIG. 12E is detected first. At this point, since two infants in FIG. 12A both have facial frames F1, the facial frames F1 of the two infants in FIG. 12A are first compared, and it is concluded by the comparison that the facial frame F1 of the infant on the left in FIG. 12A is larger. Thus, in FIG. 12A, the facial frame F1 of the infant on the left is regarded as a rating target. Next, the facial frame F1 of the infant on the left in FIG. 12A is compared in terms of size with the facial frames F1 of the infants detected in FIG. 12B to FIG. 12E. The size of the facial frame F1 of the infant on the left in FIG. 12A is 2.59 in$^2$, and the sizes of the facial frames F1 of the infants in FIG. 12B to FIG. 12E are sequentially 2.14 in$^2$, 2.06 in$^2$, 2.04 in$^2$ and 2.02 in$^2$. According to the comparison results, a facial rating grading score of +0.5 is assigned to FIG. 12A, a facial rating grading score of +0.4 is assigned to FIG. 12B, a facial rating grading score of +0.3 is assigned to FIG. 12C, a facial rating grading score of +0.2 is assigned to FIG. 12D, and a facial rating grading score of +0.1 is assigned to FIG. 12E. Since no face of an infant is detected in FIG. 12F, a facial rating grading score of +0 is directly assigned.

The step of ranking 106 is performed after the step of facial rating 105. When the step of ranking 106 is performed, refer to process F shown in FIG. 13, for multiple multimedia images V1, the target confirmation grading score, the interaction grading score, the position grading score, the facial confirmation grading score, and the facial rating grading score obtained based on the steps of target detection 101, interaction analysis 102, position assessment 103, facial confirmation 104, and facial rating 105 performed above are summed to finally obtain a total grading score, and one or more of the multimedia images that is/are top-ranked is/are selected according to the ranking of the total grading score, as the recommended image V2.

In an embodiment, as shown in FIG. 14, the processing method 100 further includes a step of artificial intelligence recommendation 107. As shown in FIG. 15, the processing unit 500 further includes an artificial intelligence recommendation module 507 for performing the step of artificial intelligence recommendation 107. The step of artificial intelligence recommendation 107 is preferably performed before the step of target detection 101 as shown in FIG. 14. The step of artificial intelligence recommendation 107 includes performing body and face recognition on the plurality of multimedia images by the artificial intelligence to obtain a recommendation grading score (AI score), wherein the total grading score is obtained from a sum including the recommendation grading score. In other words, in an embodiment, for each of the multimedia images V1, a recommendation grading score is obtained by performing the step of artificial intelligence recommendation 107. This recommendation grading score is used as a fundamental score, the target confirmation grading score, interaction grading score, position grading score, facial confirmation grading score, and facial rating grading score which are assigned after the processing method 100 is performed are summed, and then the step of ranking 106 is then performed (as shown in FIG. 16).

The terminal device 300 can be a portable mobile communication device, for example, a smartphone, or a device such as a tablet computer or a laptop computer communicatively connectable in a wired or wireless manner to the electronic device 200 via the Internet. The terminal device 300 is loaded with an application 301 (referring to FIG. 2 and FIG. 14). By executing the application 301 via the terminal device 300, a push broadcast of the recommended image V2 is received from the electronic device 200, and a user can then view the recommended image V2 via the terminal device 300.

It is apparent from the description above that the present disclosure includes the following features.

1. With the processing method and electronic device for selecting a multimedia image based on a ranking of the present disclosure, summing is performed according to the assigned target confirmation grading score, interaction grading score, position score, and facial confirmation grading score after the method is performed, and multimedia images are sorted based on the total grading score obtained, so that the selected multimedia image satisfies conditions of having a target object, having an infant in the target object, containing more interactive image contents, and a character in the image being more centered, thereby meeting user expectations.

2. The total grading score above can be further added with a facial rating grading score, which is assigned from high to low in decremental order according to the facial frame of the target object which is an infant, so that the face of the infant in the target object is bigger and more apparent and the selected multimedia image better meets user expectations.

3. In the processing method and electronic device for selecting a multimedia image based on a ranking of the present disclosure, body and facial recognition are first performed by using artificial intelligence to obtain a recommendation grading score which is summed into the total grading score, and to integrate applications of AI recommendation systems selecting multimedia images, so that the selected multimedia image further meets user expectations.

The present disclosure is described by way of the preferred embodiments above. A person skilled in the art should understand that these embodiments are merely for illustrating the present disclosure, and are not to be construed as limitations to the scope of the present disclosure. It should be noted that all equivalent changes, replacements, and substitutions made to the embodiments are encompassed within the scope of the present disclosure. Therefore, the scope of legal protection of the present disclosure should be defined by the appended claims.

What is claimed is:

1. A processing method for selecting a multimedia image based on a ranking, performed by an electronic device using of reading an executable code, identifying a plurality of multimedia images by using artificial intelligence, and performing rating and sorting processing on the plurality of multimedia images, the method comprising:

target detection, comprising identifying by using artificial intelligence whether any of the multimedia images contains a target object, determining whether the target object located in the multimedia image satisfies a confidence threshold indicating that a body and a face are clear, and assigning a target confirmation grading score;

interaction analysis, comprising, when two or more target objects are identified in any of the multimedia images by using artificial intelligence, detecting a body frame and a facial frame of each of the target objects, determining whether the body frame of each of the target objects has an intersection, and assigning an interaction grading score;

position assessment, comprising, for any of the multimedia images, determining a level of centering of a position relative to a center of the multimedia image according to the body frame of one of the target objects or according to a body set frame defined by two or more of the target objects to cover a plurality of the body frames, and assigning a position grading score;

facial confirmation, comprising identifying whether a face of the target object in any of the multimedia images contains an infant, and assigning a facial confirmation grading score; and ranking, comprising, for each of the plurality of multimedia images, summing the target confirmation grading score, the interaction grading score, the position grading score, and the facial confirmation grading score obtained based on the steps above to obtain a total grading score, and selecting at least one of the multimedia images that is top-ranked according to a ranking of the total grading score.

2. The processing method for selecting a multimedia image based on a ranking according to claim 1, further comprising:

facial rating, comprising identifying, by artificial intelligence, a plurality of multimedia images in which the target object is the infant, and assigning a facial rating grading score from high to low in decremental order according to the facial frame of the target object which is the infant, wherein the total grading score is obtained from a sum including the facial rating grading score.

3. The processing method for selecting a multimedia image based on a ranking according to claim 1, wherein before the step of facial rating, for the multiple target objects which are the infants in any of the multimedia images, face areas are compared and the facial rating is performed on a largest facial frame as a representative.

4. The processing method for selecting a multimedia image based on a ranking according to claim 1, wherein in the step of interaction analysis, for the multimedia image where the two or more target objects are located and where it is detected that each of the body frames has an intersection, the interaction grading score is assigned from high to low according to order that each of, only a part of and none of the body frames has a face.

5. The processing method for selecting a multimedia image based on a ranking according to claim 4, wherein in the step of interaction analysis, whether each of the body frames has an intersection is determined by using an original size of the body frame, or is determined after the original size of the body frame is scaled up by a one-fold increase, wherein the interaction grading score for no intersection is zero.

6. The processing method for selecting a multimedia image based on a ranking according to claim 1, wherein in the step of target detection and/or facial confirmation, if two or more target objects are identified in any of the multimedia images by using the artificial intelligence and one of the target objects is the infant, a facial set frame is defined to cover the plurality of facial frames, and it is determined whether the body frame of the infant and the facial set frame have an intersection.

7. The processing method for selecting a multimedia image based on a ranking according to claim 1, wherein in the step of position assessment, the multimedia images where the body frame and the body set frame are located are all rectangles, and a border of the multimedia image where the body frame or the body set frame is located includes an upper distance, a lower distance, a left distance, and a right distance; a first ratio is obtained by regarding the longer between the upper distance and the lower distance as a denominator and the shorter as a numerator; a second ratio is obtained by regarding the longer between left distance and the right distance as a denominator and the shorter as a numerator; each of the first ratio and the second ratio is compared with a position threshold so as to assign the position grading score; a position grading score with both of the first ratio and the second ratio being greater than the position threshold is greater than a position grading score with only one of the first ratio and the second ratio being greater than the position threshold.

8. The processing method for selecting a multimedia image based on a ranking according to claim 7, wherein in the step of position assessment, a predetermined region within the multimedia image where the body frame or the body set frame is located is set; if at least one side of the body frame or the body set frame exceeds the predetermined region, the position grading score is a negative value; a negative value of the position grading score for the body frame or the body set frame that exceeds both of two adjacent sides of at least one right angle of the predetermined region is higher than a negative value of the position grading score for the body frame or the body set frame that exceeds one side or two opposite sides of the predetermined region.

9. The processing method for selecting a multimedia image based on a ranking according to claim 7, wherein in the step of position assessment, the predetermined region is in a size proportionally downscaled from the original size of the multimedia image.

10. The processing method for selecting a multimedia image based on a ranking according to claim 7, further comprising a step of:

an artificial intelligence recommendation, comprising performing body and face recognition on the plurality of multimedia images by the artificial intelligence to obtain a recommendation grading score, wherein the total grading score is obtained from a sum including the recommendation grading score.

11. A terminal device communicatively connectable to the electronic device performing the method of claim 1, the terminal device is loaded with an application and executes the application to play at least one of the multimedia images that are top-ranked and selected by the step of ranking.

12. An electronic device for selecting a multimedia image based on a ranking, the electronic device provided to be communicatively connected to a database, the electronic device receiving a plurality of multimedia images to perform rating and sorting processing on the plurality of multimedia images by using artificial intelligence; the electronic device comprising:

a camera unit, for capturing the plurality of multimedia images; and a processing unit, electrically connected to the camera unit, the processing unit comprising:

a target detection module, adapted to identify by using artificial intelligence whether any of the multimedia images contains a target object, determine whether the target object located in the multimedia image satisfies a confidence threshold indicating that a body and a face are clear, and assign a target confirmation grading score;

an interaction analysis module, adapted to, when two or more target objects are identified in any of the multimedia images by using artificial intelligence, detect a body frame and a facial frame of each of the target objects, determine whether the body frame of each of the target objects has an intersection, and assign an interaction grading score;

a position assessment module, adapted to, for any of the multimedia images, determine a level of coverage of a predetermined region in the multimedia image according to the body frame of one of the target objects or according to a body set frame defined by two or more of the target objects to cover a plurality of the body frames, and assign a position grading score;

a facial confirmation module, adapted to, when a face of the target object in any of the multimedia images is identified as an infant by the artificial intelligence, assign a facial confirmation grading score; and a ranking module, electrically connected to the target detection module, the interaction analysis module, the position assessment module, and the facial confirmation module, the ranking module adapted to, for each of the plurality of multimedia images, sum the target confirmation grading score, the interaction grading score, the position grading score, and the facial confirmation grading score obtained by the modules above to obtain a total grading score, and select at least one of the multimedia images that is top-ranked according to a ranking of the total grading score.

13. The electronic device for selecting a multimedia image based on a ranking according to claim 12, wherein the electronic device is a physical host and/or a cloud host.

14. The electronic device for selecting a multimedia image based on a ranking according to claim 12, further comprising:

a facial rating module, adapted to identify, by the artificial intelligence, a plurality of multimedia images in which the target object is an infant, and assign a facial rating grading score from high to low in decremental order according to the facial frame of the target object which is the infant, wherein the total grading score is obtained from a sum including the facial rating grading score.

15. The electronic device for selecting a multimedia image based on a ranking according to claim 12, further comprising:

an artificial intelligence recommendation module, adapted to perform body and face recognition on the plurality of multimedia images by artificial intelligence to obtain a recommendation grading score, wherein the total grading score is obtained from a sum including the recommendation grading score.

16. A terminal device communicatively connectable to the electronic device of claim 12, wherein the terminal device is loaded with an application, and executes the application to play at least one of the multimedia images that are top-ranked and selected by the ranking module.

17. A non-transitory computer-readable recording medium, storing a plurality of executable codes, for an electronic device to read and then execute the executable codes to perform a step below such that rating and sorting processing is performed on a plurality of multimedia images by using artificial intelligence, the step comprising:

target detection, comprising identifying by using artificial intelligence whether any of the multimedia images contains a target object, determining whether the target object located in the multimedia image satisfies a confidence threshold indicating that a body and a face are clear, and assigning a target confirmation grading score;

interaction analysis, comprising, when two or more target objects are identified in any of the multimedia images by using the artificial intelligence, detecting a body frame and a facial frame of each of the target objects, determining whether the body frame of each of the target objects has an intersection, and assigning an interaction grading score;

position assessment, comprising: for any of the multimedia images, determining a level of coverage of a predetermined region in the multimedia image according to the body frame of one of the target objects or according to a body set frame defined by two or more of the target objects to cover a plurality of the body frames, and assigning a position grading score;

facial confirmation, comprising, when a face of the target object in any of the multimedia images is identified as an infant by artificial intelligence, assigning a facial confirmation grading score; and ranking, comprising, for each of the plurality of multimedia images, summing the target confirmation grading score, the interaction grading score, the position grading score, and the facial confirmation grading score obtained based on the steps above to obtain a total grading score, and selecting at least one of the multimedia images that is top-ranked according to a ranking of the total grading score.

* * * * *